United States Patent
Opalka et al.

(10) Patent No.: US 10,851,461 B2
(45) Date of Patent: Dec. 1, 2020

(54) TREATED ANODIZED METAL ARTICLE AND METHOD OF MAKING

(71) Applicant: Hamilton Sundstrand Corporation, Charlotte, NC (US)

(72) Inventors: Susanne M. Opalka, Glastonbury, CT (US); Weina Li, South Glastonbury, CT (US); Joseph J. Sangiovanni, West Suffield, CT (US); Mark R. Jaworowski, Glastonbury, CT (US); Georgios S. Zafiris, Glastonbury, CT (US); Weilong Zhang, Glastonbury, CT (US); Zhongfen Ding, South Windsor, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 214 days.

(21) Appl. No.: 15/476,453

(22) Filed: Mar. 31, 2017

(65) Prior Publication Data
US 2018/0282879 A1    Oct. 4, 2018

(51) Int. Cl.
| C23F 11/06 | (2006.01) |
| C01F 7/02 | (2006.01) |
| C25D 11/24 | (2006.01) |
| C25D 11/08 | (2006.01) |
| C25D 11/10 | (2006.01) |
| C25D 11/12 | (2006.01) |
| C25D 13/18 | (2006.01) |

(52) U.S. Cl.
CPC ............ *C23F 11/06* (2013.01); *C01F 7/02* (2013.01); *C25D 11/246* (2013.01); *C25D 11/08* (2013.01); *C25D 11/10* (2013.01); *C25D 11/12* (2013.01); *C25D 13/18* (2013.01)

(58) Field of Classification Search
CPC ...................................................... C23F 11/06
USPC ............................................................ 427/337
See application file for complete search history.

(56) References Cited

U.S. PATENT DOCUMENTS

| 4,594,481 | A * | 6/1986 | Wilham ............... H01H 13/705 200/295 |
| 5,334,570 | A * | 8/1994 | Beauseigneur .......... B01J 23/40 502/240 |
| 6,027,578 | A | 2/2000 | Marzano |
| 6,576,199 | B1 * | 6/2003 | Liu ..................... B01D 53/8675 422/177 |
| 7,773,365 | B2 | 8/2010 | Herman et al. |
| 9,340,678 | B2 | 5/2016 | Keszler et al. |

(Continued)

FOREIGN PATENT DOCUMENTS

| CN | 101230478 A | 7/2008 |
| EP | 0718239 A1 * | 6/1996 ............. B01J 13/00 |

(Continued)

OTHER PUBLICATIONS

Dressler, Sol-Gel Preparation and Characterization of Corundum Based Ceramic Oxidation Protection Coatings, Dissertation, Aug. 30, 1977, p. 1-143 (Year: 1977).*

(Continued)

*Primary Examiner* — Tabatha L Penny
(74) *Attorney, Agent, or Firm* — Cantor Colburn LLP

(57) ABSTRACT

A method is disclosed for treating an anodized metal surface. According to the method, polynuclear clusters comprising aluminum oxide hydroxide are applied to the anodized metal surface.

16 Claims, 1 Drawing Sheet

(56) References Cited

U.S. PATENT DOCUMENTS

| | | |
|---|---|---|
| 9,476,137 B2 | 10/2016 | Ohmi et al. |
| 2011/0284381 A1 | 11/2011 | Cabot et al. |
| 2013/0084672 A1* | 4/2013 | Keszler ............ H01L 31/02168 |
| | | 438/72 |
| 2014/0326151 A1 | 11/2014 | Namba et al. |

FOREIGN PATENT DOCUMENTS

| | | |
|---|---|---|
| WO | 2011057422 A1 | 5/2011 |
| WO | 2016051976 A1 | 4/2016 |

OTHER PUBLICATIONS

European Search Report from the European Patent Office for EP Application No. 18165524.2 dated Jul. 18, 2018, 17 pages.

M. E. Carnes, et al., "Electrochemical synthesis of flat-[Ga13-xInx(□3-OH)6(□-OH)18(H2O)24(NO3)15] clusters as aqueous precursors for solution-processed semiconductors," J. Mater. Chem. C 2 (2014) 8492-6.

Y. Adraider, et al., "Deposition of alumina coatings on stainless steel by a combined laser/sol—gel technique," Materials Letters 91 (2013) 88-91.

R. Funk, et al. Abstract Only: "Coating of Cemented Carbide Cutting Tools with Alumina by Chemical Vapor Deposition,", J. Electrchem. Soc., 123 (1976).

Wang, et al. "Synthesis and Characterization of Aluminum Oxide Based Materials—from Molecule to Device", Thesis 2013, 150 pages.

\* cited by examiner

TREATED ANODIZED METAL ARTICLE AND METHOD OF MAKING

BACKGROUND

This disclosure relates to anodizing and anodized metal articles.

Enhanced surface oxides can be formed by anodization processing on a select group of metals and their base alloys: aluminum, titanium, zirconium, hafnium, niobium, tantalum, tungsten, magnesium, zinc, and iron. Anodizing is used to electrolytically modify metal surfaces of commercial products, especially those on aluminum (Al) alloy structural and decorative product components. Traditional MIL-A-8625 type I or IB anodizing using chromic acid can generate process fumes and waste streams containing hexavalent chromium (Cr(VI)) species, which is being phased out for environmental reasons.

In typical anodizing processes, a metal article is connected as an anode of an electrolytic circuit in an electrolyte bath to form a layer or region of metal oxide at the surface of the metal article. When the metals are anodized in electrolytes in which the anodic oxides are not significantly soluble, dense and self-limiting barrier anodic oxides are formed that can provide increased surface corrosion protection, hardness, and wear resistance. In other cases, anodization can result in the formation of non-limiting anodic oxides which contain packed columnar pores growing from a thin inner barrier layer. These thicker porous anodic oxides provide enhanced interfacial adhesion with subsequently applied primers, conversion coatings, paints, and metal electrodeposits, but are not as effective for corrosion protection.

For both dense and porous anodized surfaces, the anodic oxides can be sealed to enhance corrosion protection, such as to meet a one thousand hour ASTM B117 salt fog test performance requirement. Traditionally, sealing has been conducted by treating the porous anodic oxide in boiling water or steam, which reacts with the pore walls to fill the pores with aluminum oxide hydroxide phases such as amorphous pseudo-boehmite. Additional corrosion protection can be achieved by sealing the pores with sodium dichromate or potassium dichromate treatments. However, alternative surface treatments are needed, since Cr (VI)-containing chemicals are being phased out or eliminated internationally through the regulations of multiple governing bodies.

BRIEF DESCRIPTION

In some embodiments, a method of treating an anodized metal surface comprises applying polynuclear clusters comprising aluminum oxide hydroxide to the anodized metal surface.

In some embodiments, a method of surface treating a metal article comprises anodizing the metal article to form an anodized surface on the metal article, and applying polynuclear clusters comprising aluminum oxide hydroxide to the anodized surface.

In some embodiments, an article comprises a metal body, an anodized surface on the metal body, and polynuclear clusters comprising aluminum oxide hydroxide, or a reaction product of said polynuclear aluminum oxide hydroxide clusters, disposed on the anodized surface.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
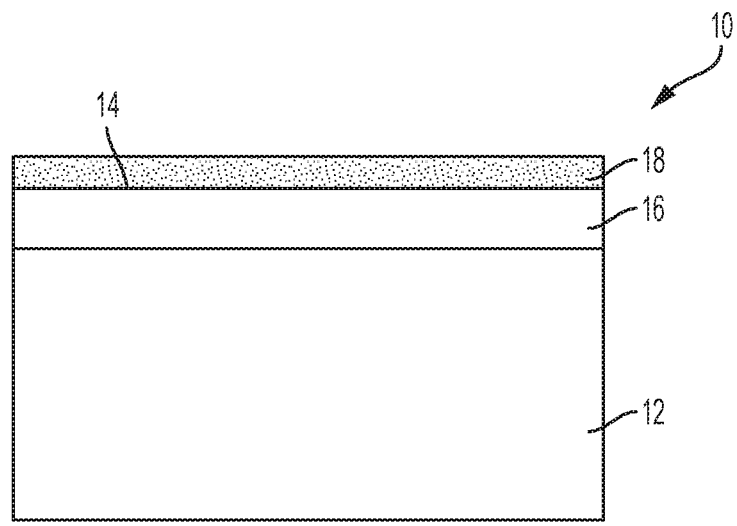
FIG. 1 is a schematic depiction of a treated anodized article.

With reference now to the Figures, FIG. 1 is a schematic depiction of a treated anodized metal article 10. As shown in FIG. 1, the article 10 includes a metal body 12 with an anodized surface 14. The metal body can be made of any anodizable metal (including both pure metals and their base metal alloys), including but not limited to aluminum, titanium, zirconium, hafnium, niobium, tantalum, tungsten, magnesium, zinc, and iron. In some embodiments, the anodizable metal can be aluminum, including aluminum alloys such as Aluminum Association Series numbered alloys in the series 1000 through 8000. In some embodiments, the anodizable metal can be in the form of a thin film (e.g., Al) that is bonded to substrate that cannot be anodized. Anodizing a metal body can be accomplished by placing the metal article in an anodizing bath comprising an electrolyte. The metal body is connected as an anode in a circuit with a cathode in the anodizing bath and an electrical power source connected to the anode and to the cathode. The determination of electrolyte and composition of the anodizing bath can be made based on the composition of the metal article and the target properties for the anodized surface. For example, anodic oxides can be formed on aluminum (as used herein, the term "aluminum" includes aluminum alloys unless explicitly noted) or other metals such as titanium, magnesium, tungsten in aqueous baths containing acid electrolytes in which the oxide is moderately soluble such as phosphoric acid, sulfuric acid, boric acid, or organic acids such as tartaric acid, citric acid, malic acid, oxalic acid, glycolic, or malonic acid. Combinations of acids can be utilized, such as sulfuric acid and an organic acid comprising two or more carboxylic acid groups per molecule (e.g., sulfuric acid and tartaric acid), or sulfuric acid and boric acid. Chromic acid is not required, and in some embodiments, the anodizing bath is chromium-free. Aluminum, magnesium, iron, and titanium can also be anodized in some aqueous salt-containing electrolytes of reduced acidity or that are non-acidic (e.g., silicate salts, borate salts or tartrate salts).

During anodization, electric current is applied to the circuit to electrolytically induce chemical and structural modifications at the surface of the anode. The composition of the electrolyte or concentrations of the components thereof, temperature, electrical voltage, ramping rate, and electrical current can be controlled during anodization by the skilled person to produce targeted modifications such as the formation of metal oxide with targeted morphology, thickness, and porosity at the metal surface. Anodization treatment conditions that have been developed for a wide range of substrates and applications can be used, for example, see MIL-A-8625F, Military Specification: Anodic Coatings for Aluminum and Aluminum Alloys (10 Sep. 1993). With reference again to FIG. 1, a layer or region of metal oxide 16 (hereafter "layer 16") is shown at the anodized surface 14. It should be noted that although the layer 16 is shown in FIG. 1 as a single contiguous layer, it can comprise multiple anodized layers such as the duplex anodized disclosed in US published application US 2016/0017510 A1 or PCT published application WO 2015/195639 A1, the disclosures of both of which are incorporated herein by reference in their entirety. Additionally, it should be noted that although FIG. 1 depicts the layer 16 as a solid layer, it can be a porous layer over a solid barrier layer or have other openings in some embodiments, as discussed in more detail further below. As used herein, the terms "pore" or "porous" refers to and includes packed columnar pores (FIGS. 2A, 2B), and also other surface topographical features such as interconnected pore structures, wormhole-like pore structures, or other surface topographical features that provide recesses or variations from planar smoothness in the surface topography. In some embodiments, the total thickness of anodized metal oxide layer(s) at the anodized surface can be in a range with a lower end of 0.05 µm, 0.5 µm, or 1 µm, and upper end of 10 µm, 30 µm, or 100 µm. The thickness of the base barrier layer is typically tens or hundreds of nanometers and varies with the applied voltage. The geometry and the packing of the pores can be a function of the applied voltage, the electrolyte composition, the bath temperature, the anodization time, and the total current passed. Anodic oxide pore diameters can range from several nanometers up to 100 nanometers. The pore densities can range from 5 to 90% of the total anodic oxide volume. These endpoints can be independently combined, and ranges with all possible combinations of the above lower and upper endpoints are hereby explicitly disclosed.

As mentioned above, pores of an anodized surface can be sealed by applying polynuclear clusters comprising aluminum oxide hydroxides to the anodized surface. As used herein, the term "aluminum oxide hydroxide" means polynuclear clusters of atoms comprising aluminum nuclei connected through oxide or hydroxide groups. The polynuclear aluminum oxide hydroxide clusters can be prepared, for example, starting with the dissolution of an aluminum salt or salt precursor [e.g., $AlCl_3$, $Al(NO_3)_3$, $Al(CH_3CO_2)_3$ (Al triacetate), or $Al[OCH(CH_3)H_5]_3$ (Al tri sec-butoxide)] in water to achieve an equivalent $Al^{3+}$ concentration of about 0.02 to 2.0 moles/liter. The polynuclear aluminum oxide hydroxide clusters are synthesized by controlled neutralization or hydrolysis of the $Al^{3+}$ solution at an elevated temperature (e.g., 70° C.), by titrating with a base solution to achieve a mole ratio $(OH^-/Al)=2.1-2.6$, preferably in the range of 2.2-2.4, resulting in a pH of 4-7. The base solutions for titration can include NaOH, KOH, ammonium hydroxide ($NH_4OH$), sodium bicarbonate ($NaHCO_3$), and sodium carbonate ($Na_2CO_3$). Any undesired counter-ions, such as $Cl^-$, can be removed by ion exchange (metathesis) with a salt (e.g., a sulfate such as $Na_2SO_4$, $KSO_4$, $BaSO_4$), or by ion exchange with anionic ligands (e.g., fluoride, carboxylate) that weakly bind to the outer coordination sphere of the polynuclear aluminum oxide hydroxide clusters. These ion exchange reactions can result in precipitation of the polynuclear aluminum oxide hydroxide clusters. These precipitates can be washed and filtered before reconstituting into a liquid coating formulation. Other synthesis techniques can also be used, such as the electroless reduction of anions and water in $Al(NO_3)_3$ or other aluminum salt aqueous solutions, such as disclosed in US patent application publication US2013/0084672A1, the disclosure of which is incorporated herein by reference in its entirety. Alternatively, the polynuclear aluminum oxide hydroxide clusters can be prepared by aqueous electrolysis using sacrificial aluminum anodes, following a similar method to aluminum electro-coagulation technologies employed for water purification.

In embodiments, the polynuclear clusters comprising aluminum oxide hydroxide can be configured as $Al_{13}$ Keggin cations, which can be characterized by the formula $[AlO_4Al_{12}(OH)_{24}(H_2O)_{12}]^{7+}$. In some embodiments, $Al_{13}$ Keggin cations are complexed with counter ions, and can be characterized by the formula $[AlO_4Al_{12}(OH)_{24}(H_2O)_{12}]^{7+*}[(7/n) X^{-n}]^{7-}$ where $X^{-n}$ represents '-n' charge-bearing X counter-ion species and $(7/n) X^{-n}$ are needed to neutralize the total complex charge, e.g., $[AlO_4Al_{12}(OH)_{24}(H_2O)_{12}]^{7+*}[7NO_3^-]^{7-}$. The $Al_{13}$ cluster is the most prevalent large polynuclear aluminum oxide hydroxide species, but other polynuclear aluminum oxide hydroxide clusters can be formed, such as the aluminum species having the formula $[Al_2O_8Al_{28}(OH)_{56}(H_2O)_{26}]^{18+}$, referred to as the '$Al_{30}$ cluster', which can be formed by the condensation of two $Al_{13}$ clusters bridged with 4 monomeric aluminum ions.

Once synthesized, the polynuclear aluminum oxide hydroxide clusters can be applied to an anodized surface, schematically depicted in FIG. 1 as a layer 18 of applied polynuclear aluminum oxide hydroxide clusters. This can be accomplished in various ways. The ionic characteristics of the polynuclear aluminum oxide hydroxide clusters can provide compatibility with various liquid carriers such as water for use in a liquid coating composition. The polynuclear aluminum oxide hydroxide clusters can be present in a liquid coating composition in an amount in a range with a lower end of 0.007 moles/liter (m/l), 0.010 m/l, or 0.015 m/l, and upper end of 0.07 m/l, 0.10 m/l, or 0.30 m/l of $Al_{13}$ clusters. These endpoints can be independently combined, and ranges with all possible combinations of the above lower and upper endpoints (excluding impossible combinations where a 'lower' endpoint would be greater than an 'upper' endpoint) are hereby explicitly disclosed. The liquid carrier for the coating composition can be aqueous or an organic solvent (e.g., a polar organic solvent such as methanol, ethanol, isopropanol, butanol, acetic acid, formic acid, dimethylformamide, ethyl acetate, tetrahydrofuran). Polynuclear aluminum oxide hydroxide clusters in a liquid coating composition can be applied using various techniques, including but not limited to spraying, dipping, spin-coating, painting (e.g., brush, sponge, roller painting), or electrophoresis (e.g., pulsed electrophoresis) to deposit positively-charged polynuclear aluminum oxide hydroxide clusters onto the negatively charged anodized surfaces (cathode). An electrical bias may be applied on the anodized components to facilitate the polynuclear aluminum oxide hydroxide cluster infiltration using an electrophoretic driving force.

In some embodiments, the liquid coating composition can include a surfactant to promote penetration of the coating composition into the anodized surface layer 16 (FIG. 1). Liquid coating compositions can also include various materials and additives including but not limited to organic or polymeric binders, pH buffers, oxidants, corrosion inhibitors, chelating agents, rheology modifiers, or monomeric metal ions. In addition, anodization electrolyte species can remain adsorbed on the pore wall surfaces and can influence the pore wall charge interactions with the polynuclear aluminum oxide hydroxide clusters. These additives can serve to accelerate the polynuclear aluminum oxide hydroxide coagulation, deposition, and adhesion with the anodic oxide pore channels or other surface topographical features.

In some embodiments, the treatment to the anodized surface can include coagulants, in addition to the above-referenced polynuclear aluminum oxide hydroxide clusters. Examples of materials that can be used as such additional coagulants include salts of oxides of metals or semi-metals such as silicon, molybdenum, tungsten, vanadium, iron, chromium, zinc, or copper, and metal mixtures comprising one or more of the foregoing. In particular, the alkali, alkaline earth, and ammonium salts of these metals (e.g., $Na_2MoO_4$, $Na_2WO_4$, $Mg_3Si_2O_9H_4$, or $(NH_4)_2MoO_4$) can be used as added coagulants. In some embodiments, an added coagulant can be included in the coating composition in an amount characterized by an atomic ratio of Al/M where Al represents a quantity of aluminum atoms contained in the polynuclear aluminum oxide hydroxide clusters and M represents a quantity of metal or semi-metal atoms in the added coagulant. In some embodiments, an amount of additional metal or semimetal containing coagulant in the coating composition as expressed by the Al/M ratio can be in a range of ratio values with a lower end of 1.5, 2.0, or 2.5, and upper end of 5.0, 10.0, or 15.0. These endpoints can be independently combined, and ranges with all possible combinations of the above lower and upper endpoints are hereby explicitly disclosed. Although this disclosure is not bound by any particular mechanism or theory of operation, in some embodiments the added coagulant may impact precipitate crystalline ordering, enhance phase transformation kinetics of the coating as it consolidates, act as nucleation agents for crystallization, or any combination of mechanisms including one or more of the foregoing. In some embodiments, the added coagulant can include or be capable of releasing a corrosion inhibitor and the polynuclear aluminum oxide hydroxide clusters can serve as adjuvants for facilitating corrosion inhibition. Examples of added coagulants that function as anodic corrosion inhibitors include oxide clusters of silicon, molybdenum, tungsten, vanadium, and chromium(III). Examples of coagulants that function as cathodic corrosion inhibitors include zinc, magnesium, or alkaline earth hydroxide clusters, and rare earth metal cations. In some embodiments, the added coagulant can be salts of metal oxides, including ammonium salts, such as $(NH_4)_2MoO_4$, $(NH_4)_2WO_4$, or $(NH_4)_3VO_3$, where that the $NH_4^+$ cation is released as $NH_3$ during application and drying, without leaving residue.). In some embodiments, ionic properties of the added coagulant can promote hydrophilic properties of the coagulant, or the added coagulant is otherwise hydrophilic (e.g., alkaline earth metal hydroxides). In some embodiments, added coagulant can form clusters, which may interact with or form an adduct with the polynuclear aluminum oxide hydroxide clusters. In some embodiments, the coagulant can be separately prepared and incorporated into the coating composition. In some embodiments, the coagulant can be separately applied, such as in a coating composition separate from the coating composition containing the polynuclear aluminum oxide hydroxide clusters. The separate application of added coagulants can occur prior to, simultaneous with, or after the application of the polynuclear aluminum oxide hydroxide clusters, and in some embodiments can serve to enhance coagulation after they are infiltrated into the pore channels.

In some embodiments, one or more silicates can be included in the coating composition as an added coagulant. In some embodiments where silicate is included in the coating composition, an amount of silicate in the coating composition as expressed by an Al/Si atomic ratio can be in a range of ratio values with a lower end of 1.0, 2.0, or 5.0, and upper end of 10.0, 12.0, or 15.0. These endpoints can be independently combined, and ranges with all possible combinations of the above lower and upper endpoints are hereby explicitly disclosed. Examples of silicates include sodium metasilicate ($Na_2SiO_3$), sodium orthosilicate ($Na_4SiO_4$), or disodium disilicate $Na_2Si_2O_5$. Silicates (including silicate mixtures) can be introduced into an aqueous solution to form polynuclear silicic acid clusters, which can then react in solution with the polynuclear clusters comprising aluminum oxide hydroxide to form hydroxy aluminosilicate oligomers that are less soluble and are precipitated out of solution. The precipitated hydroxy aluminosilicate oligomer material can be collected, washed and dried, reconstituted in a liquid coating formulation and applied to the anodized surface. The silicate co-coagulants can also be prepared as a separate sealant co-reactant feed solution.

The applied polynuclear clusters comprising aluminum oxide hydroxide can be subjected to drying to remove water. In the case of polynuclear aluminum oxide hydroxide clusters applied in a liquid coating composition, the applied coating can optionally be titrated to a basic pH (e.g., 7-10) before drying to precipitate the applied polynuclear aluminum oxide hydroxide clusters and form a gel layer comprising the polynuclear aluminum oxide hydroxide clusters on the anodized surface. Drying and removal of water from the polynuclear aluminum oxide hydroxide clusters can initially form amorphous $Al(OH)_3$ or pseudo-boehmite structures that can be represented by the formula $AlOOH.H_2O$. Over time, these structures can transform to protective aluminum trihydroxide bayerite or gibbsite, or boehmite crystalline structures. An optional heating step can be applied to promote a condensation reaction to form alumina. Any sealant heat treatment conditions should be compatible with the metal alloy substrate annealing, solution, and precipitation/aging heat treatments applied to achieve specific metallurgical tempers, secondary phase characteristics, or mechanical properties. For example, the component may be heated to a temperature ranging of about 250-500° C. for about two hours. During heating, ramp-up over temperatures of about 100 to about 500° C. will cause any remaining water, ligands, and non-metallic counter-ions or additives present in the coating to desorb or to decompose. Above 300° C., boehmite or aluminum trihydroxide can transform to a fully dense transition-alumina phase (including $\chi$-$Al_2O_3$, $\eta$-$Al_2O_3$, or $\gamma$-$Al_2O_3$), and any Al—Si oxides/hydroxides can transform to an amorphous aluminosilicate matrix. Full alumina nanocrystallite transformation to $\alpha$-$Al_2O_3$ is possible at temperatures above 1000° C. Sintering can occur at even higher temperatures, e.g., above 1100° C.

Additional disclosure regarding polynuclear aluminum oxide hydroxide clusters, coating compositions and coatings comprising the same, and application and processing of such coating compositions can be found in co-pending U.S. patent application Ser. No. 15/449,673 filed on Mar. 3, 2017, entitled "Thermal Barrier Coating Compositions, Methods of Manufacture Thereof and Articles Comprising the Same", the disclosure of which is incorporated herein in its entirety.

Figures 2A, 2B:
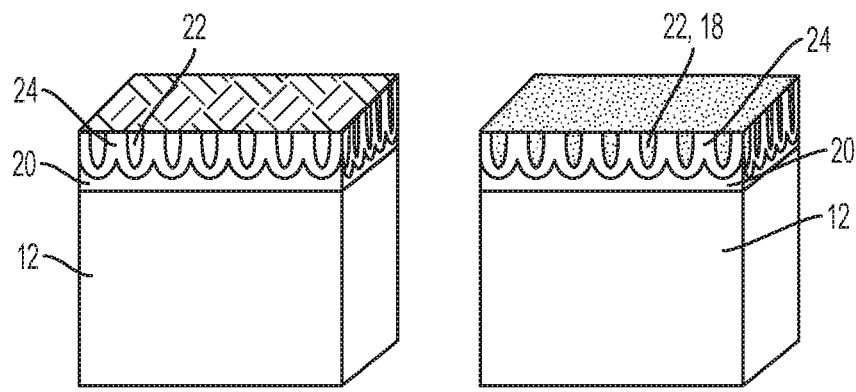
FIGS. 2A and 2B each represents a schematic depiction of an anodized surface, before and after treatment.

The polynuclear aluminum oxide hydroxide cluster surface treatments described herein can be used to treat any anodized surface, including as a top-coat over smooth or high-density anodized surface layers. In some embodiments, a beneficial technical effect can be produced by applying the polynuclear aluminum oxide hydroxide clusters to seal anodized surfaces having pores or other openings. Some anodizing process such as phosphoric acid anodizing process can produce oxides with an outer columnar pore layer. In some embodiments, the porosity of the anodized surface layer can be in a range with a lower end of 5%, 10%, or 15%, and upper end of 85%, 90%, or 95%, with percentages expressed as volume percent of pore volume based on total volume of the anodized surface layer. In some embodiments, an anodized surface layer formed by phosphoric acid anodizing can include metal oxide filaments in a metal oxide matrix, as disclosed in greater detail in the above-incorporated US 2016/0017510 A1 and WO 2015/195639 A1. In some embodiments, the anodized surface layer can include a cross-section filament areal density greater than 35%. Areal filament density can be determined by examination of a cross-section scanning electron microscope image of the layer in a plane perpendicular to the surface of the layer, and visually measuring the area of the total area in the cross-section represented by the filaments as a percentage of the entire cross-section area. These endpoints can be independently combined, and ranges with all possible combinations of the above lower and upper endpoints (excluding impossible combinations where a 'lower' endpoint would be greater than an 'upper' endpoint) are hereby explicitly disclosed. This structure can promote adhesion and bonding to other materials through its high surface area, but can also be susceptible to corrosion. In some embodiments, as shown in FIGS. 2A and 2B, the applied polynuclear aluminum oxide hydroxide clusters can penetrate and seal pores of anodized surfaces. FIGS. 2A and 2B schematically show a magnified cross-sectional view that includes an anodized surface such as 16 from FIG. 1, with pores. As shown in FIGS. 2A and 2B, the anodized surface includes a thin inner metal oxide barrier layer 20, with columnar pores or openings 22 between columnar metal oxide structures 24. In FIG. 2B, polynuclear clusters comprising aluminum oxide hydroxide 18 have been applied, and are shown as coagulated and sealing the pores 22.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of treating an anodized metal surface, comprising:
   applying polynuclear clusters comprising aluminum oxide hydroxide to the anodized metal surface, wherein the polynuclear aluminum oxide hydroxide clusters comprise $Al_{13}$ clusters according to the formula: $[AlO_4Al_{12}(OH)_{24}(H_2O)_{12}]^{7+}*[(7/n)X^{-n}]^{7-}$ where $X^{-n}$ represents '-n' charge-bearing X counter-ion species and $(7/n)X^{-n}$ are needed to neutralize the total complex charge, or $Al_{30}$ clusters formed by condensation of two of said $Al_{13}$ clusters bridged with four monomeric aluminum ions.

2. The method of claim 1, further comprising subjecting the applied polynuclear aluminum oxide hydroxide clusters to a condensation reaction.

3. The method of claim 1, wherein applying the polynuclear aluminum oxide hydroxide clusters includes disposing the polynuclear aluminum oxide hydroxide clusters within pores of said anodized metal surface.

4. The method of claim 1, further comprising applying a coagulant different than the polynuclear aluminum oxide hydroxide clusters.

5. The method of claim 4, wherein the coagulant comprises a corrosion-inhibiting ion.

6. The method of claim 4, wherein the coagulant comprises silicate, molybdate, tungsten, vanadium, or chromium (III) oxide salts.

7. The method of claim 1, further comprising drying the applied polynuclear aluminum oxide hydroxide clusters to remove water.

8. The method of claim 1, further comprising heating the applied polynuclear aluminum oxide hydroxide clusters.

9. The method of claim 1, wherein applying the polynuclear aluminum oxide hydroxide clusters comprises applying a liquid coating composition comprising the polynuclear aluminum oxide hydroxide clusters to the anodized metal surface.

10. The method of claim 9, further comprising applying a coagulant different than the polynuclear aluminum oxide hydroxide clusters, wherein the coagulant is applied prior to the liquid coating composition, as part of the liquid coating composition, or subsequent to the liquid coating composition.

11. The method of claim 9, wherein the liquid coating composition further comprises a surfactant, binder, pH buffer, oxidant, corrosion inhibitor, chelating agent, rheology modifier, or monomeric metal ions.

12. The method of claim 9, further comprising titrating the applied liquid coating composition to an alkaline pH to form a gel comprising the polynuclear aluminum oxide hydroxide clusters.

13. The method of claim 1, wherein the anodized metal surface comprises an anodized aluminum oxide layer over metal body comprising aluminum or an aluminum alloy.

14. The method of claim 1, further comprising:
   neutralization or hydrolysis of a solution comprising an aluminum salt or aluminum salt precursor to form said polynuclear clusters; or
   electroless reduction of anions and water in aluminum nitrate to form said polynuclear clusters; or
   aqueous electrolysis using sacrificial aluminum anodes to form said polynuclear clusters.

15. A method of surface treating a metal article, comprising:
   anodizing the metal article to form an anodized surface on the metal article; and
   applying polynuclear aluminum clusters comprising aluminum oxide hydroxide to the anodized surface, wherein the polynuclear aluminum oxide hydroxide clusters comprise $Al_{13}$ clusters according to the formula: $[AlO_4Al_{12}(OH)_{24}(H_2O)_{12}]^{7+}*[(7/n)X^{-n}]^{7-}$ where $X^{-n}$ represents '-n' charge-bearing X counter-ion species and $(7/n) X^{-n}$ are needed to neutralize the total complex charge, or $Al_{30}$ clusters formed by condensation of two of said $Al_{13}$ clusters bridged with four monomeric aluminum ions.

16. The method of claim 15, wherein applying the polynuclear aluminum oxide hydroxide clusters comprises:
   applying a coating composition comprising the polynuclear aluminum oxide hydroxide clusters to the anodized surface;
   optionally titrating the applied coating composition to an alkaline pH to gel the applied coating composition;
   drying the applied coating composition to remove water; and
   optionally subjecting the dried composition to heat treatment.

* * * * *